USO10129378B2

(12) United States Patent
Nonaka et al.

(10) Patent No.: US 10,129,378 B2
(45) Date of Patent: Nov. 13, 2018

(54) ELECTRONIC APPARATUS

(71) Applicant: KYOCERA Corporation, Kyoto-shi, Kyoto (JP)

(72) Inventors: Keisuke Nonaka, Osaka (JP); Atsuki Ooi, Higashihiroshima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/253,682

(22) Filed: Aug. 31, 2016

(65) Prior Publication Data

US 2016/0373566 A1 Dec. 22, 2016

Related U.S. Application Data

(63) Continuation of application No. PCT/JP2016/054389, filed on Feb. 16, 2016.

(30) Foreign Application Priority Data

Feb. 25, 2015 (JP) ................................ 2015-035217

(51) Int. Cl.
*H04R 1/02* (2006.01)
*H04M 1/03* (2006.01)
*H04M 1/18* (2006.01)

(52) U.S. Cl.
CPC ............ *H04M 1/035* (2013.01); *H04M 1/03* (2013.01); *H04M 1/185* (2013.01)

(58) Field of Classification Search
CPC ................ H04R 2499/11; H04R 17/00; H04R 2499/15; H04R 1/2811; H04R 2440/05;
(Continued)

(56) References Cited

U.S. PATENT DOCUMENTS 6,411,719 B1 * 6/2002 Moster .................... H04M 1/03 379/433.02
6,462,938 B1 * 10/2002 Horne ................. H04M 1/0266 343/702

(Continued)

FOREIGN PATENT DOCUMENTS

JP 2005-536912 A 12/2005
JP 2006-279358 * 10/2006

(Continued)

OTHER PUBLICATIONS

International Search Report and Written Opinion of the International Searching Authority issued by the Japan Patent Office for counterpart International Patent Application No. PCT/JP2016/054389.

*Primary Examiner* — Norman Yu
(74) *Attorney, Agent, or Firm* — Procopio Cory Hargreaves and Savitch LLP

(57) ABSTRACT

An electronic apparatus is disclosed. An electronic apparatus comprises a panel, a case, a speaker, and a cover member. The panel comprises a first surface and a second surface located opposite to the first surface. The case supports the second surface. The speaker is located inside the case and outputs a sound. The cover member covers at least part of the first surface. The cover member comprises a first opening through which the sound output from the speaker is transmitted to the outside of the electronic apparatus. The first opening and part of the case overlap each other in a first direction along a thickness direction of the panel.

7 Claims, 7 Drawing Sheets

(58) Field of Classification Search
CPC ........ H04R 29/001; H04R 9/045; H04R 9/06; H04R 1/00; H04R 1/025; H04R 1/2803; H04R 1/2842; H04R 1/2849; H04R 1/288; H04R 1/323; H04R 1/345; H04M 1/03; H04M 1/0266; H04M 1/026; F16M 11/041
USPC ......... 381/151, 394, 304, 332, 334, 337, 59; 345/156, 173
See application file for complete search history.

(56) References Cited

U.S. PATENT DOCUMENTS

| | | | | |
|---|---|---|---|---|
| 7,233,678 | B2 | 6/2007 | Erixon et al. | |
| 8,913,738 | B2 * | 12/2014 | Qingshan | H04M 1/035 379/433.02 |
| 8,948,825 | B2 | 2/2015 | Matsushima et al. | |
| 2015/0326967 | A1 | 11/2015 | Otani | |

FOREIGN PATENT DOCUMENTS

| | | | |
|---|---|---|---|
| JP | 2006-279358 | A | 10/2006 |
| JP | 2008-111984 | A | 5/2008 |
| JP | 2011-193183 | A | 9/2011 |
| JP | 2013-131987 | A | 7/2013 |
| WO | 2004/004408 | A1 | 1/2004 |

* cited by examiner

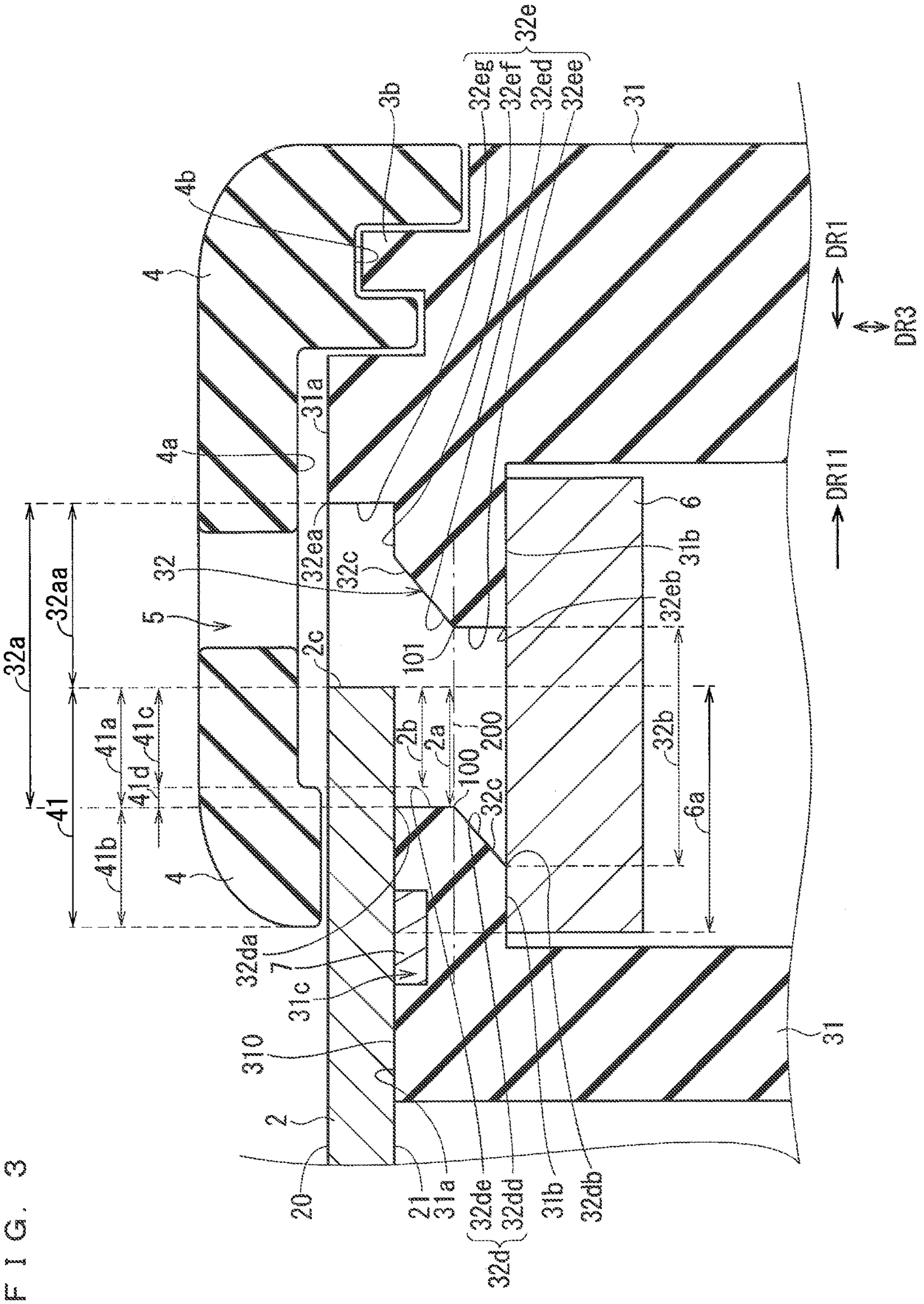
F I G. 3

ELECTRONIC APPARATUS

CROSS-REFERENCE TO RELATED APPLICATION

The present application is a continuation based on PCT Application No. PCT/JP2016/054389 filed on Feb. 16, 2016, which claims the benefit of Japanese Application No. 2015-035217, filed on Feb. 25, 2015. PCT Application No. PCT/JP2016/054389 is entitled "ELECTRONIC APPARATUS", and Japanese Application No. 2015-035217 is entitled "ELECTRONIC APPARATUS". The contents of which are incorporated by reference herein in their entirety.

FIELD

Embodiments of the present disclosure relate to an electronic apparatus.

BACKGROUND ART

Various technologies have conventionally been proposed for electronic apparatuses.

SUMMARY

An electronic apparatus is disclosed. In one embodiment, an electronic apparatus comprises a panel, a case, a speaker, and a cover member. The panel comprises a first surface and a second surface located opposite to the first surface. The case supports the second surface. The speaker is located inside the case and outputs a sound. The cover member covers at least part of the first surface. The cover member comprises a first opening through which the sound output from the speaker is transmitted to the outside of the electronic apparatus. The first opening and part of the case overlap each other in a first direction along a thickness direction of the panel.

BRIEF DESCRIPTION OF DRAWINGS

FIG. 3 illustrates a view showing an enlarged schematic cross-sectional structure of the electronic apparatus.

DETAILED DESCRIPTION

<External Appearance of Electronic Apparatus>

Figure 1:
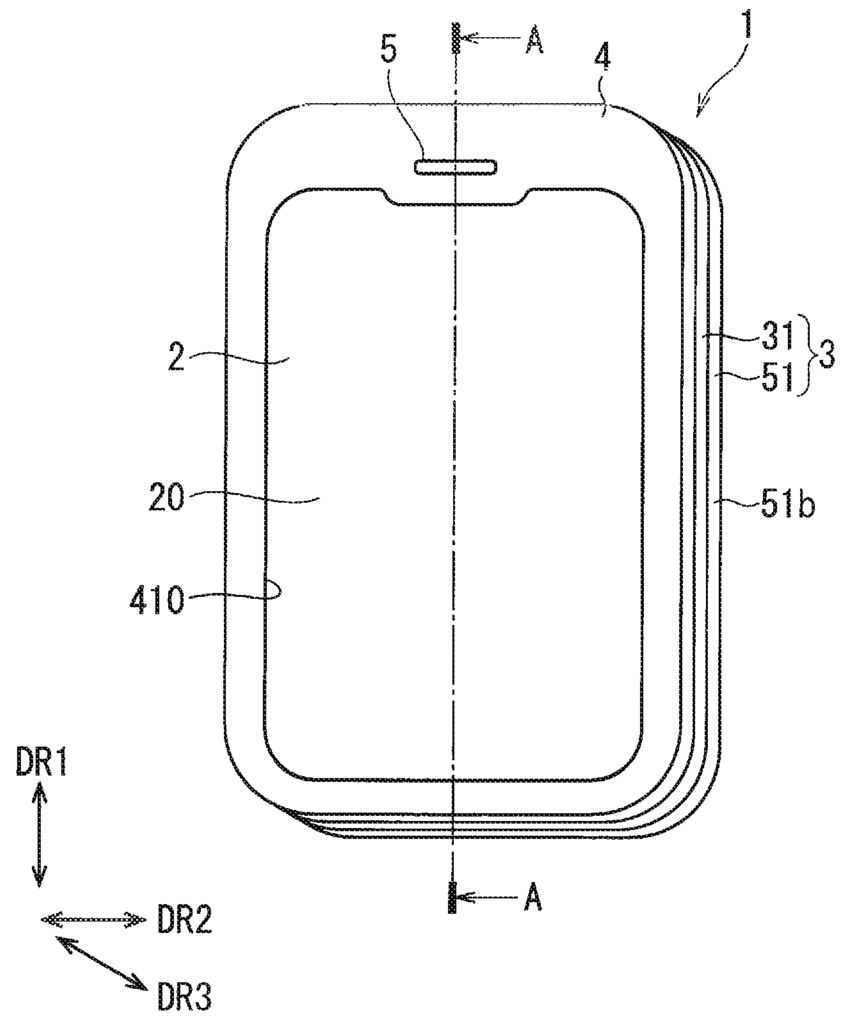
FIG. 1 illustrates a perspective view schematically showing one example of an external appearance of an electronic apparatus.
Figure 2:
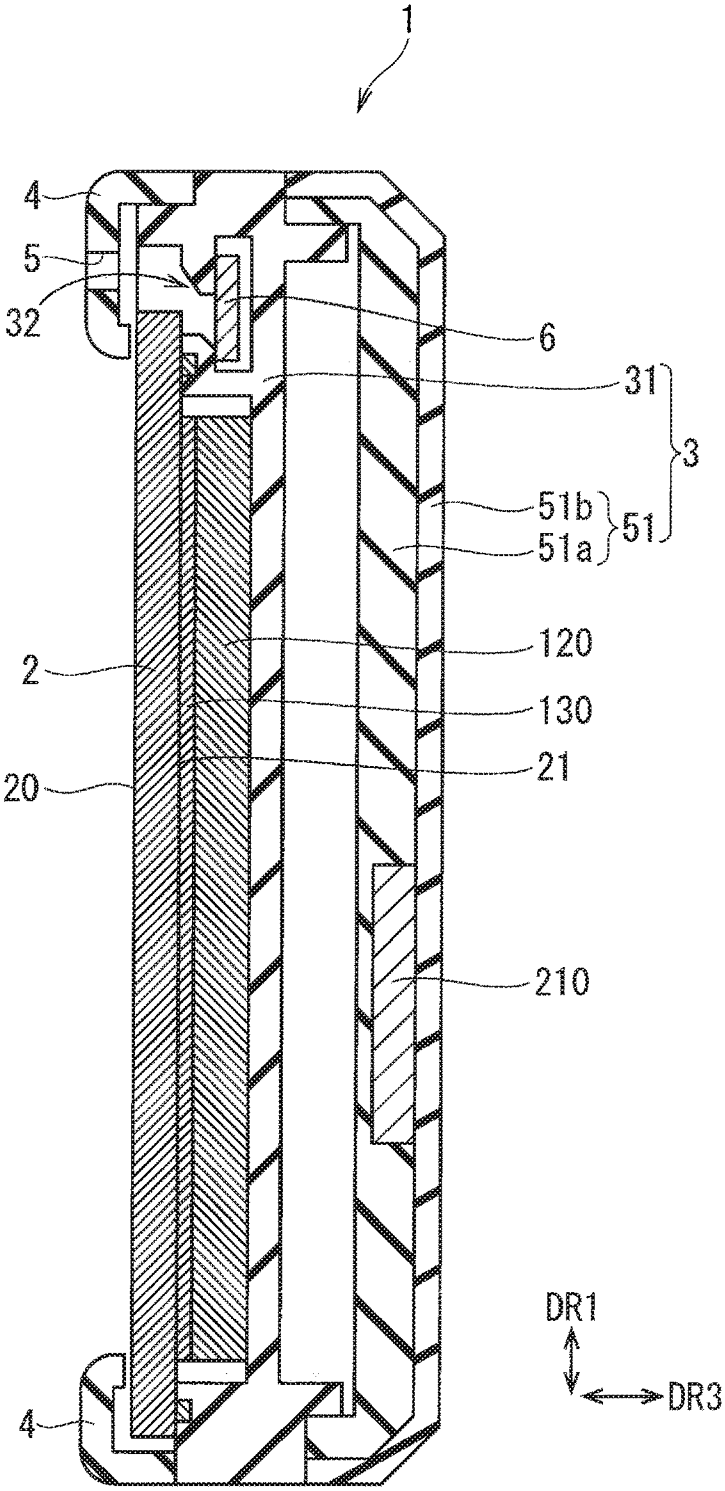
FIG. 2 illustrates a view showing a schematic cross-sectional structure of the electronic apparatus.

FIG. 1 illustrates a perspective view schematically showing one example of an external appearance of an electronic apparatus 1. FIG. 2 illustrates a view showing a schematic cross-sectional structure taken along an A-A line illustrated in FIG. 1. The electronic apparatus 1 is, for example, a mobile phone such as a smartphone.

As illustrated in FIGS. 1 and 2, the electronic apparatus 1 includes a panel 2 located on the front of the electronic apparatus 1, a case 3 to which the panel is bonded, and a cover member 4 attached to the case 3 from the front side of the electronic apparatus 1. In addition, the electronic apparatus in the disclosure includes an electronic apparatus that does not include the cover member 4.

The case 3 includes a front case 31 to which the panel 2 is attached and a back case 51 attached to the front case 31. As illustrated in FIG. 2, the back case 51 includes a case body 51*a* housing a battery 210, which will be described below, and a back cover 51*b*. The back cover 51*b* is attached to the case body 51*a* from a back side of the electronic apparatus 1. The battery 210 housed in the case body 51*a* is covered with the back cover 51*b*. The front case 31 and the back case 51 are attached to each other with an adhesive agent or a bonding agent, which is not shown. The case 3 includes the front case 31 and the back case 51 as described above, and the case 3 may also be formed by a single component.

The cover member 4 has a substantially rectangular frame shape in plan view and is attached to the front case 31 of the case 3 so as to cover a peripheral end portion of the front surface of the panel 2. Most part of the panel 2 except for the peripheral end portion thereof is exposed from an opening 410 of the cover member 4. The exterior of the electronic apparatus 1 includes the panel 2, the case 3, and the cover member 4. The electronic apparatus 1 has a substantially rectangular plate shape in plan view.

The panel 2 forms a front portion of the electronic apparatus 1 except for an outer edge portion of the front portion of the electronic apparatus 1. The case 3 forms a back portion of the electronic apparatus 1 and a back side portion of a side portion of the electronic apparatus 1. The cover member 4 forms the outer edge portion of the front portion of the electronic apparatus 1 and a front side portion of the side portion of the electronic apparatus 1. The case 3 and the cover member 4 are made of resin, or resin and metal, for example. The resin includes polycarbonate resin, ABS resin, and nylon resin, for example. The metal includes aluminum, for example.

The panel 2 has a plate shape, and has a substantially rectangular shape in plan view when not being covered with the cover member 4. A longitudinal direction of the panel 2 corresponds to a vertical direction of the electronic apparatus 1. The panel 2 has an outer main surface 20 forming the front surface of the electronic apparatus 1 and has an inner main surface 21 located opposite to the outer main surface 20.

As illustrated in FIG. 1, the panel 2 has a substantially rectangular shape having a long length in a first direction DR1 parallel to the outer main surface 20. Thus, when it is assumed that a direction parallel to the outer main surface 20 and perpendicular to the first direction DR1 is a second direction DR2, the panel 2 has a length in the first direction DR1 greater than a length in the second direction DR2. A direction perpendicular to the outer main surface 20 and the inner main surface 21 is assumed to be a third direction DR3. Hereinafter, the first direction DR1, the second direction DR2, and the third direction DR3 may respectively be referred to as a longitudinal direction DR1, a lateral direction DR2, and a thickness direction DR3. The electronic apparatus in the disclosure is not limited to an electronic apparatus that includes the panel 2 of the substantially rectangular shape having the long length in the first direction DR1 parallel to the outer main surface 20.

The panel 2 is made of sapphire. In other words, the panel 2 is a panel in a single-layer structure including a layer of sapphire located on the surface of the electronic apparatus 1. Herein, sapphire represents a monocrystal containing alumina ($Al_2O_3$) as a main component, and represents a monocrystal containing $Al_2O_3$ having a purity of greater than or equal to approximately 90% in embodiments of the disclosure. $Al_2O_3$ may have a purity of greater than or equal to 99% in order to further increase resistance to scratching and to more reliably suppress cracks and chipping. In addition, examples of materials for the panel 2 include crystalline materials such as diamond, zirconia, titania, crystal, lithium tantalite, and aluminum oxynitride. These materials may also be a monocrystal having a purity of greater than or equal to approximately 90% in order to further increase resistance to scratching and to more reliably suppress cracks and chipping.

The panel 2 may be a composite panel (hereinafter may be referred to as a laminated panel) in a multilayer structure including the layer of sapphire. For example, the cover panel 2 may be a laminated panel in a two-layer structure that includes the layer of sapphire (hereinafter may be referred to as a sapphire panel) located on the surface of the electronic apparatus 1 and a layer of glass (hereinafter may be referred to as a glass panel) bonded to the sapphire panel. The cover panel 2 may be a laminated panel in a three-layer structure that includes a first sapphire panel (first sapphire layer) located on the surface of the electronic apparatus 1, a glass panel (glass layer) bonded to the first sapphire panel, and a second sapphire panel (second sapphire layer) bonded to the glass panel.

A display 120 including a liquid crystal display or an organic electroluminescent (EL) display, for example, is located on the inner main surface 21 of the panel 2. The display 120 can display various pieces of information such as letters, symbols, figures, and images. A user of the electronic apparatus 1 can visually identify the information displayed on the display 120 through the panel 2.

A touch panel 130 such as a projected capacitive touch panel is bonded to the inner main surface 21 of the panel 2. The display 120 is bonded to a main surface of the touch panel 130 opposite to the main surface toward the inner main surface 21 of the panel 2. In other words, the display 120 is attached to the inner main surface 21 of the panel 2 with the touch panel 130 therebetween. The display 120 is sandwiched between the panel 2 and the front case 31. The user of the electronic apparatus 1 can provide various instructions to the electronic apparatus 1 by operating the exposed surface of the outer main surface 20 of the panel 2 with an operator such as a finger.

As illustrated in FIGS. 1 and 2, an upper portion of the cover member 4 has a through hole 5 through which a sound output from a speaker 6 located inside the case 3 comes out of the electronic apparatus 1. As illustrated in FIG. 2, an upper portion of the front case 31 has a through hole 32 through which the sound output from the speaker 6 comes out of the electronic apparatus 1. The speaker 6 is, for example, a receiver capable of outputting a reception sound, such as a dynamic speaker. The speaker 6 can convert an electrical sound signal into a sound and output the sound.

As illustrated in FIG. 2, the battery 210 capable of outputting power supply of the electronic apparatus 1 is housed in the case body 51*b*. The power supply output from the battery 210 is supplied to electronic components, such as the touch panel 130, of the electronic apparatus 1.

<Internal Structure of Electronic Apparatus>

<Structure of Peripheral Portion of Speaker>

The electronic apparatus 1 includes an opening portion for transmitting the sound from the speaker 6 inside the case 3 to the outside of the electronic apparatus 1. A structure of a peripheral portion of the speaker 6 in the electronic apparatus 1 is described below in detail.

FIG. 3 illustrates a view showing an enlarged schematic cross-sectional structure taken along the A-A line illustrated in FIG. 1. FIG. 3 illustrates the enlarged cross-sectional structure of a portion of the electronic apparatus 1 in which the speaker 6 is located. As illustrated in FIGS. 2 and 3, the front case 31 functions as a supporting portion supporting the inner main surface 21 of the panel 2. Hereinafter, the front case 31 may be referred to as a supporting portion 31.

The supporting portion 31 has a support surface 31*a* on the front side of the electronic apparatus 1 and a back surface 31*b* located opposite to the support surface 31*a*. The support surface 31*a* forms the front surface of the case 3.

Figure 4:
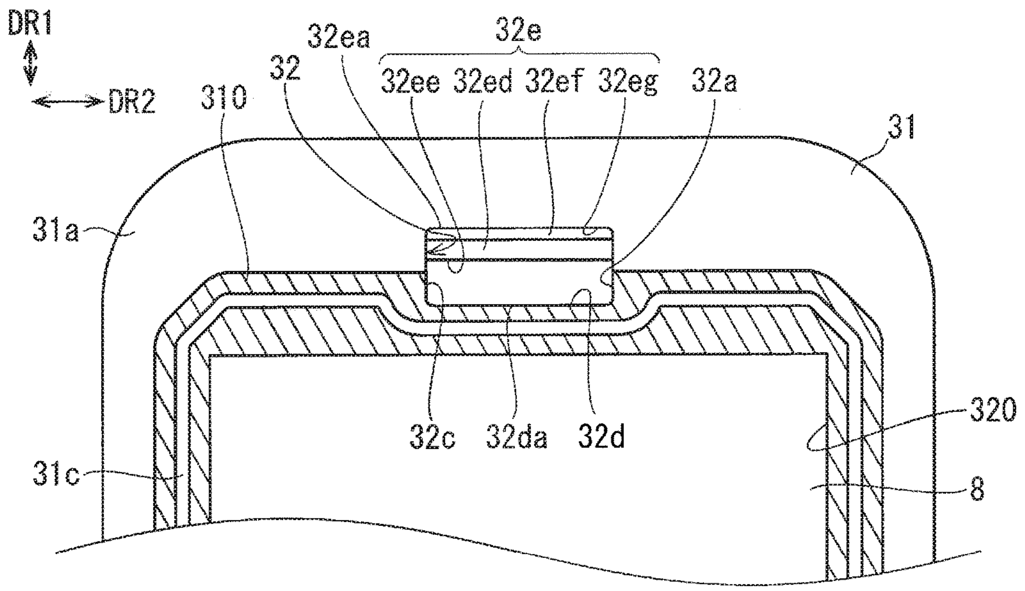
FIG. 4 illustrates a plan view showing a supporting portion when viewed from a support surface side.

FIG. 4 illustrates a plan view showing the supporting portion 31 when viewed from the support surface 31*a* side. In FIG. 4, of the support surface 31*a* of the supporting portion 31, a panel bonding region 310 to which the panel 2 is bonded is diagonally shaded.

As illustrated in FIG. 4, the supporting portion 31 (front case 31) has a frame shape. A sheet metal 8 integrally molded with the supporting portion 31 is located in an opening 320 of the supporting portion 31. The sheet metal 8 increases stiffness of the supporting portion 31. The panel bonding region 310 is one step lower than the other regions in the support surface 31*a* of the supporting portion 31. The sheet metal 8 is also one step lower than the other regions in the support surface 31*a*.

As illustrated in FIGS. 3 and 4, the panel bonding region 310 in the support surface 31*a* of the supporting portion 31 has a groove portion 31*c* that is recessed in the thickness direction DR3. The groove portion 31*c* surrounds the opening 320 of the supporting portion 31. The panel 2 is bonded to the supporting portion 31 with a bonding member 7 located in the groove portion 31*c*. Specifically, the entire circumference of the outer edge portion of the inner main surface 21 of the panel 2 is bonded to the panel bonding region 310 of the supporting portion 31 with the bonding member 7. The bonding member 7 includes an adhesive agent, for example. The shape of the case 3 allowing the panel 2 to be bonded to the case 3 is not restrictive. The panel 2 may be bonded to the case 3 with a double-sided tape instead of the adhesive agent. This case eliminates the need for the groove portion 31*c* in the case 3.

As illustrated in FIG. 3, the supporting portion 31 has a through hole 32 penetrating the supporting portion 31 from the support surface 31*a* to the back surface 31*b*. The through hole 32 is an opening portion for transmitting the sound from the speaker 6 located inside the case 3 to the outside of the electronic apparatus 1. The through hole 32 has a first opening 32*a* located in the support surface 31*a* of the supporting portion 31 and a second opening 32*b* located in the back surface 31*b*.

As illustrated in FIG. 3, the speaker 6 is attached to the back surface 31*b* of the supporting portion 31 so as to face the second opening 32*b* of the through hole 32. The speaker 6 is attached to the supporting portion 31 with the double-sided tape or the adhesive agent, for example. The speaker 6 can output the sound toward the through hole 32. The speaker 6 has a counter portion 6*a* facing the inner main surface 21 in the thickness direction DR3 of the panel 2.

As described above, the through hole 32 for transmitting the sound output from the speaker 6 inside the case 3 to the outside of the electronic apparatus 1 is located in the case 3. Therefore, even if the speaker 6 has the counter portion 6*a* facing the panel 2 in the thickness direction DR3, the sound from the speaker 6 can be transmitted to the outside of the electronic apparatus 1. The speaker 6 is attached to the supporting portion 31 so as to face the second opening 32*b* of the through hole 32, and thus the sound output from the speaker 6 can easily come out of the electronic apparatus 1.

In a case where the speaker 6 is attached so as not to face the panel 2 in the thickness direction DR3, the speaker 6 and the panel 2 need to be greatly displaced from each other in the longitudinal direction DR1, for example. In this case, the electronic apparatus 1 has the length increased in the longitudinal direction DR1. In the disclosure, the through hole 32 is located in the case 3, to thereby allow the sound output from the speaker 6 to be transmitted to the outside of the electronic apparatus 1 and also allow the speaker 6 to be located such that part of the speaker 6 faces the panel 2 in the thickness direction DR3. This can reduce the length of the electronic apparatus 1.

<Structure of Through Hole in Case>

A structure of the through hole 32 in the case 3 is described below in detail.

Figure 5:
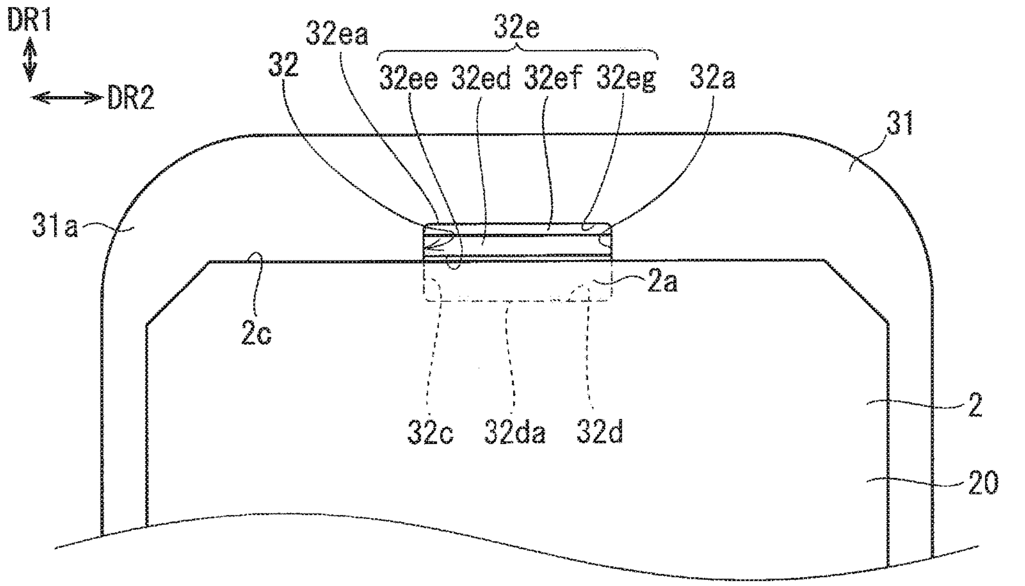
FIG. 5 illustrates a plan view showing the supporting portion to which a panel is bonded when viewed from an outer main surface side of the panel.

FIG. 5 illustrates a plan view showing the supporting portion 31 to which the panel 2 is bonded when viewed from the outer main surface 20 side of the panel 2. As illustrated in FIG. 5, the panel 2 has a shape whose four corners are cut, for example.

As illustrated in FIG. 5, the through hole 32 and the panel 2 when viewed from the outer main surface 20 side of the panel 2 are arranged along the longitudinal direction DR1. The through hole 32 is located closer to the upper side than the panel 2 is. The panel 2 covers part of the first opening 32*a* of the through hole 32. Specifically, the panel 2 covers the substantially lower half of the first opening 32*a*.

In a case where the panel 2 does not cover part of the first opening 32*a*, the panel 2 needs to be greatly displaced from the first opening 32*a* in the longitudinal direction DR1, for example. In this case, the electronic apparatus 1 has the length increased in the longitudinal direction DR1. The panel 2 is attached to the case 3 so as to cover the substantially lower half of the first opening 32*a* in the disclosure, so that the electronic apparatus 1 can have the length reduced.

As illustrated in FIGS. 3 and 5, an inner wall 32*c* of the through hole 32 has a first counter surface 32*d* and a second counter surface 32*e* that face each other in the longitudinal direction DR1. The first counter surface 32*d* is located closer to the panel 2 than the second counter surface 32*e* is in the longitudinal direction DR1.

The first counter surface 32*d* is located at the back of the panel 2. Thus, the panel 2 and one end 32*da* of the first counter surface 32*d* on the first opening 32*a* side overlap each other in plan view when viewed from the outer main surface 20 side of the panel 2. Also in the plan view, the panel 2 and one end 32*db* of the first counter surface 32*d* on the second opening 32*b* side overlap each other. In contrast, the second counter surface 32*e* is not located at the back of the panel 2. Thus, the panel 2 does not cover one end 32*ea* of the second counter surface 32*e* on the first opening 32*a* side and one end 32*eb* of the second counter surface 32*e* on the second opening 32*b* side in the plan view when viewed from the outer main surface 20 side of the panel 2.

The first counter surface 32*d* includes a first inclined region 32*dd* inclined from the second opening 32*b* side to the first opening 32*a* side toward a fourth direction DR11 that extends from the first counter surface 32*d* to the second counter surface 32*e*. The first inclined region 32*dd* is inclined toward the fourth direction DR11 with respect to the thickness direction DR3 and extends from the one end 32*db* of the first counter surface 32*d* on the second opening 32*b* side toward the first opening 32*a*. The first counter surface 32*d* includes a first perpendicular region 32*de* that is connected to the first inclined region 32*dd* and that faces a second inclined region 32*ed*, which will be described below, in the longitudinal direction DR1. The first perpendicular region 32*de* extends from the one end 32*da* of the first counter surface 32*d* on the first opening 32*a* side toward the second opening 32*b* in the thickness direction DR3.

The second counter surface 32*e* includes the second inclined region 32*ed* inclined from the second opening 32*b* side to the first opening 32*a* side toward the fourth direction DR11. The second counter surface 32*e* includes a second perpendicular region 32*ee* that is connected to the second inclined region 32*ed* and that faces the first inclined region 32*dd* in the first direction DR1. The second counter surface 32*e* includes a flat region 32*ef* and a third perpendicular region 32*eg*. The second perpendicular region 32*ee* extends from the one end 32*eb* of the second counter surface 32*e* on the second opening 32*b* side toward the first opening 32*a* in the thickness direction DR3. The second inclined region 32*ed* is inclined toward the fourth direction DR1 with respect to the thickness direction DR3 and extends from one end, which is opposite to the one end of the second perpendicular region 32*ee* on the second opening 32*b* side, toward the first opening 32*a*. The flat region 32*ef* extends from one end, which is opposite to the one end of the second inclined region 32*ed* on the second perpendicular region 32*ee* side, and extends farther away from the second inclined region 32*ed* in the longitudinal direction DR1. The third perpendicular region 32*eg* extends from one end, which is opposite to the one end of the flat region 32*ef* on the second inclined region 32*ed* side, toward the first opening 32*a* in the thickness direction DR3.

As described above, the first counter surface 32*d* and the second counter surface 32*e*, which face each other, of the through hole 32 each include the inclined region inclined from the second opening 32*b* side to the first opening 32*a* side toward the fourth direction DR11. Therefore, a region 32*aa* (see FIG. 3), which is uncovered with the panel 2, of the first opening 32*a* can be increased even when the one end 32*db* of the first counter surface 32*d* on the second opening 32*b* side is located at the back of the panel 2. In other words, the region 32*aa* can be increased even when the panel 2 and the one end 32*db* of the first counter surface 32*d* on the second opening 32*b* side overlap each other in the plan view when viewed from the outer main surface 20 side of the panel 2. Thus, the sound output from the speaker 6 can easily come out of the electronic apparatus 1 through the through hole 32.

The supporting portion 31 (front case 31) is molded with a die, for example. For example, the supporting portion 31 is molded by combining two dies into which a molding material such as resin is poured. After the molding material is cured, the two dies are divided, and the completed supporting portion 31 is removed therefrom.

A divided surface of the two dies in the through hole 32 is set to be a plane 200 (see FIG. 3) parallel to the longitudinal direction DR1, and the plane 200 connects a boundary 100 between the first inclined region 32*dd* and the first perpendicular region 32*de* of the first counter surface 32*d* to a boundary 101 between the second inclined region 32*ed* and the second perpendicular region 32*ee* of the second counter surface 32*e*. The first inclined region 32*dd* of the first counter surface 32*d* and the second perpendicular region 32*ee* of the second counter surface 32*e* are located toward the second opening 32*b*. The first perpendicular region 32*de* of the first counter surface 32*d* and the second inclined region 32*ed* of the second counter surface 32*e* are located toward the first opening 32*a*. Thus, occurrence of an undercut can be suppressed in the through hole 32 on each of the side toward the first opening 32*a* and the side toward the second opening 32*b* from the divided surface of the dies. This allows the completed supporting portion 31 to be easily removed from the dies. Therefore, the supporting portion 31 can be easily molded with the dies.

<Detailed Structure of Cover Member>

As illustrated in FIG. 3, a recessed portion 4*b* that is recessed toward the front surface of the electronic apparatus 1 is located in an outer edge portion of a back surface 4*a* of the cover member 4. On the other hand, a protruding portion 3*b* that protrudes toward the cover member 4 is located in the outer edge portion of the support surface 31*a* of the supporting portion 31 (outer edge portion of the front surface of the case 3). The protruding portion 3*b* of the supporting portion 31 is fit in the recessed portion 4*b* of the cover member 4, and thus the cover member 4 is attached to the supporting portion 31. A method for attaching the cover member 4 to the case 3 is not limited to the above-mentioned method. The protruding portion 3*b* is omitted from FIGS. 4 and 5.

As illustrated in FIGS. 3 and 5, the upper end portion of the panel has a portion 2*a* partially covering the first opening 32*a* of the through hole 32. In other words, the portion 2*a* of the panel 2 is not supported by the supporting portion 31. Thus, when force is exerted on the portion 2*a* of the panel 2 from the outer main surface 20 side of the panel 2, the vicinity of an end face 2*c* of the upper end portion of the panel 2 may break.

Thus, the cover member 4 is attached to the case 3 so as to cover the portion 2*a* of the panel 2, as illustrated in FIG. 3.

Figure 6:
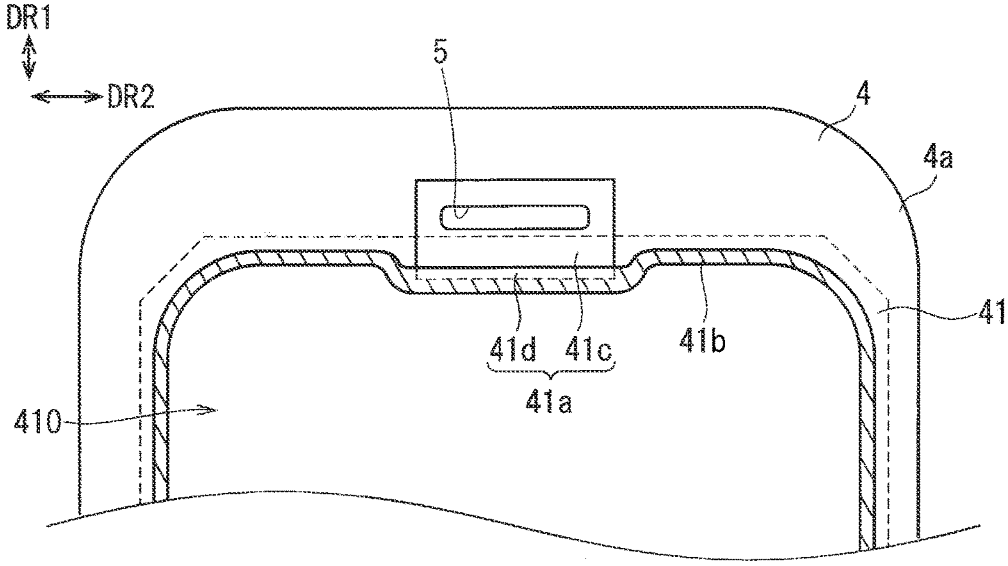
FIG. 6 illustrates a plan view showing a cover member when viewed from a back side of the cover member.

FIG. 6 illustrates a plan view showing the cover member 4 when viewed from the back surface 4*a* side of the cover member 4. The recessed portion 4*b* of the cover member 4 is omitted from FIG. 6. As illustrated in FIGS. 3 and 6, the cover member 4 has the through hole 5 through which the sound output from the speaker 6 comes out of the electronic apparatus 1. The through hole 5 in the cover member 4 faces the through hole 32 in the case 3. The cover member 4 has the through hole 5 facing the through hole 32 in the case 3, so that the sound output from the speaker 6 can easily come out of the electronic apparatus 1.

As illustrated in FIGS. 3 and 6, the cover member 4 has a counter surface 41 facing the panel 2 in the thickness direction DR3. The counter surface 41 includes a first region 41*a* facing the portion 2*a* of the panel 2 in the thickness direction DR3 and a second region 41*b* facing the supporting portion 31 with the panel 2 therebetween in the thickness direction DR3. In FIG. 6, the second region 41*b* is diagonally shaded.

The first region 41*a* includes a third region 41*c* located farther from the panel 2 than the second region 41*b* from the panel 2 in the thickness direction DR3. In other words, the third region 41*c* is located closer to the front surface of the electronic apparatus 1 than the second region 41*b* is. The third region 41*c* faces a portion 2*b* that is included in the portion 2*a* of the panel 2 and that includes the end face 2*c* of the upper end portion of the panel 2. A region 41*d* of the first region 41*a* except for the third region 41*c* is located on the same plane as the second region 41*b*. Thus, the third region 41*c* is located closer to the front surface of the electronic apparatus 1 than the region 41*d* is.

As described above, the first region 41*a*, which faces the portion 2*a* of the panel 2, of the back surface 4*a* of the cover member 4 is located farther from the panel 2 than the second region 41*b* is in the thickness direction DR3, and the first region 41 a includes the third region 41*c* that faces the portion 2*b* including the end face 2*c* of the panel 2. In other words, the back surface 4*a* of the cover member 4 includes the third region 41*c* that faces the portion 2*b* of the portion 2*a* of the panel 2 at a distance, the portion 2*b* including the end face 2*c*. This can suppress the force to be exerted on the portion 2*b* including the end face 2*c* of the panel 2 from the outer main surface 20 side of the panel 2. Thus, a break in the vicinity of the end face 2*c* of the panel 2 can be suppressed.

The panel 2 includes the sapphire layer. Sapphire is a monocrystal containing alumina ($Al_2O_3$) as a main component, and has hardness extremely higher than that of acrylic resin or glass, for example. For this reason, the sapphire layer on which the force is exerted is hardly bent and hardly broken. On the other hand, the sapphire layer is hardly processed by mechanical processing. For example, when a through hole is formed in the sapphire layer by mechanical processing, a great force may be exerted on the vicinity of the through hole. Consequently, when a processed portion such as the through hole is formed in the panel 2, an end face of the processed portion may crack. Alternatively, a crack may occur in the vicinity of the processed portion during mechanical processing.

If force is exerted on the vicinity of the processed portion, which has a defect such as a crack, of the sapphire panel, cleavage in sapphire progresses along a crystalline structure from the defect as the starting point, possibly resulting in a break in the panel 2. Thus, when having the processed portion such as the through hole, even the panel 2 made of sapphire, which has high hardness and is hardly broken, is more easily broken than the panel 2 having a simple shape.

When it is assumed that the panel 2 has a through hole or a slit portion through which the sound output from the speaker 6 comes out of the electronic apparatus 1, the hole or the slit portion is not easily formed in the panel 2 due to the sapphire layer of the panel 2. Further, a processed surface may crack when the hole or the slit portion is formed in the panel 2. Moreover, the panel 2 may break from the processed surface of the panel 2 as the starting point.

The case 3 and the cover member 4 each have the through hole for transmitting the sound output from the speaker 6 to the outside of the electronic apparatus 1 in the disclosure. Therefore, the panel 2 does not need to be processed for transmitting the sound from the speaker 6 to the outside of the electronic apparatus 1 even when the speaker 6 has the counter portion 6*a* facing the panel 2 in the thickness direction DR3 of the panel 2. As a result, the panel 2 can be easily manufactured. Further, occurrence of a crack or a break in the panel 2 can be suppressed. Thus, the panel 2 can increase in strength.

In addition, the panel 2 may include a layer made of hardly processable crystalline materials such as diamond, zirconia, titania, crystal, lithium tantalite, and aluminum oxynitride except for sapphire. A crack or a break in the panel 2 in this case can also be suppressed similarly to the panel 2 including the sapphire layer.

Although the through hole 32 is assumed to be the opening portion for transmitting the sound from the speaker 6 inside the case 3 to the outside of the electronic apparatus 1 in one example described above, the opening portion in the disclosure is not limited to this. For example, even in one example including the through hole 32 as illustrated in FIG. 3, an opening formed by the panel 2 and the case 3 as in a modification described below may be assumed to be an opening portion in the disclosure. Specifically, the region 32*aa* (opening between the end face 2*c* of the panel 2 and the third perpendicular region 32*eg* of the supporting portion 31), which is uncovered with the panel 2, of the first opening 32*a* in FIG. 3 may be assumed to be an opening portion.

<Various Modifications>

<First Modification>

Although the through hole 32 located in the supporting portion 31 of the case 3 is the opening portion for transmitting the sound from the speaker 6 to the outside of the electronic apparatus 1 in one example described above, the shape of the opening portion is not restrictive.

Figure 7:
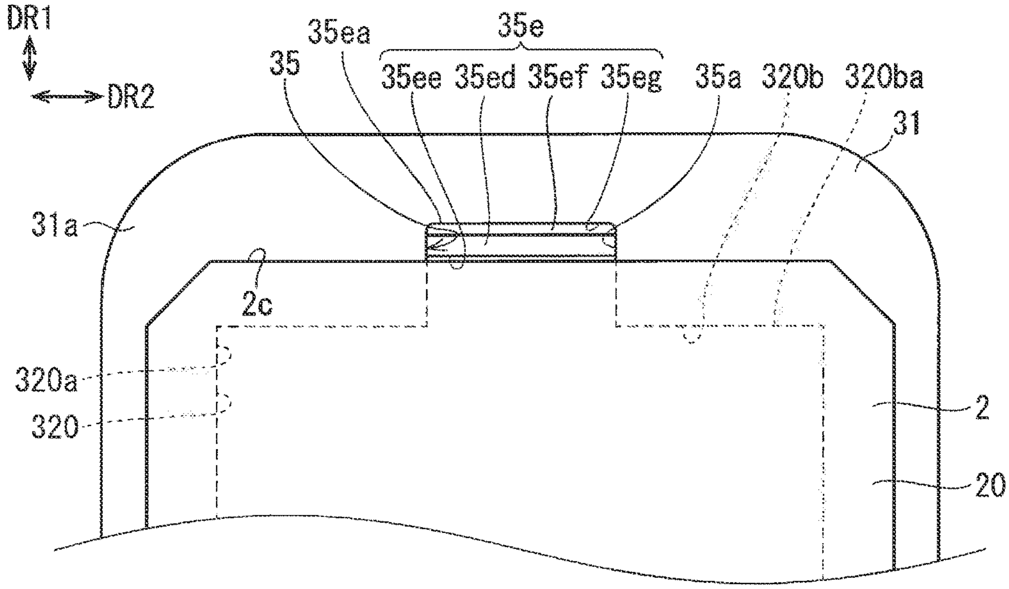
FIG. 7 illustrates a plan view showing the supporting portion to which the panel is bonded when viewed from the outer main surface side of the panel.

FIG. 7 illustrates a plan view showing the supporting portion 31, according to a first modification, to which the panel 2 is bonded when viewed from the outer main surface 20 side of the panel 2. As illustrated in FIG. 7, an opening portion 35 for transmitting the sound from the speaker to the outside of the electronic apparatus 1 is located in the supporting portion 31. In comparison with the through hole 32 illustrated in FIGS. 3 to 5, the opening portion 35 has such a shape that the first counter surface 32*d* of the through hole 32 is removed. Specifically, the opening portion 35 is formed by a recessed portion such that part of a surface 320*b* is recessed upward in the longitudinal direction DR1 in the surface 320*b* being an upper portion of an inner wall 320*a* forming an opening 320 of the supporting portion 31. The opening portion 35 has an opening 35*a* located in the support surface 31*a*.

A region 35*e* being an upper surface of an inner wall of the opening portion 35 has the same shape as the shape of the second counter surface 32*e* of the through hole 32 illustrated in FIGS. 3 to 5. A perpendicular region 35*ee*, an inclined region 35*ed*, a flat region 35*ef*, and a perpendicular region 35*eg* of the region 35*e* have the same shapes as those of the second perpendicular region 32*ee*, the second inclined region 32*ed*, the flat region 32*ef*, and the third perpendicular region 32*eg* of the second counter surface 32*e*, respectively.

One end 35*eg* of the region 35*e* on the opening 35*a* side is not covered with the panel 2. In other words, the panel 2 covers part of the lower portion of the opening 35*a*.

As described above, the opening portion 35, which is different from the through hole 32, for transmitting the sound output from the speaker 6 located inside the case 3 to the outside of the electronic apparatus 1 is located in the case 3 in the first modification. The opening portion 35 having the shape described above can transmit the sound from the speaker 6, which is located inside the case 3 so as to face the panel 2, to the outside of the electronic apparatus 1 in a similar manner as the through hole 32.

<Second Modification>

Figure 8:
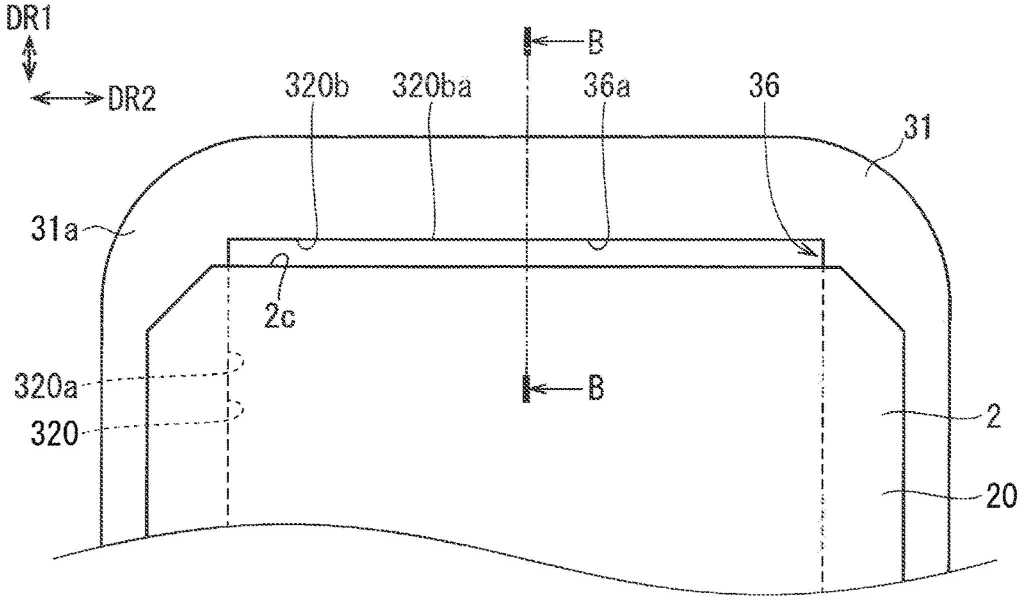
FIG. 8 illustrates a plan view showing the supporting portion to which the panel is bonded when viewed from the outer main surface side of the panel.
Figure 9:
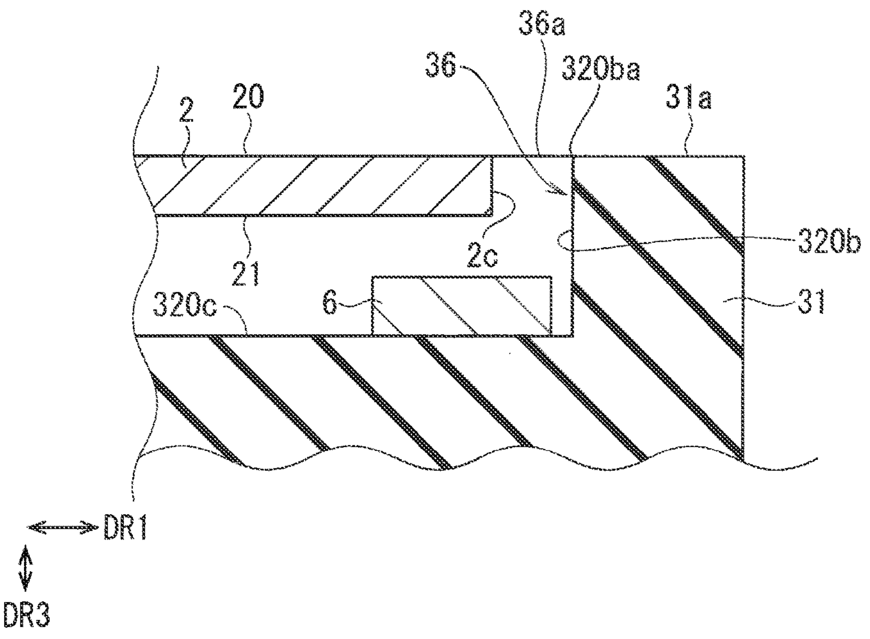
FIG. 9 illustrates a view showing an enlarged schematic cross-sectional structure of the electronic apparatus.

Although the opening portion for transmitting the sound from the speaker 6 to the outside of the electronic apparatus 1 is formed in the case 3 in one example described above, the opening portion may be formed by the case 3 and a member other than the case 3. FIG. 8 illustrates a plan view showing the supporting portion 31, according to a second modification, to which the panel 2 is bonded when viewed from the outer main surface 20 side of the panel 2. FIG. 9 illustrates a view showing an enlarged schematic cross-sectional structure taken along a B-B line illustrated in FIG. 8.

As illustrated in FIGS. 8 and 9, the inner wall 320*a* of the opening 320 located in the supporting portion 31 has the surface 320*b* being the upper portion of the inner wall 320*a*. The surface 320*b* of the inner wall 320*a* has one end 320*ba* located on the opening 320 side. The one end 320*ba* of the surface 320*b* is not covered with the panel 2. Thus, an opening portion 36 is formed by the end face 2*c* of the panel 2 and the surface 320*b* of the supporting portion 31. The opening portion 36 has an opening 36*a* located on the support surface 31*a* side of the supporting portion 31 and the outer main surface 20 side of the panel 2.

In this manner, the opening portion 36 is formed by the case 3 and the panel 2. The opening portion having such a structure is still capable of transmitting sound from the speaker 6, which is located inside the case 3 so as to face the panel 2, to the outside of the electronic apparatus 1 in a similar manner as the through hole 32 and the opening portion 35.

As illustrated in FIG. 9, the speaker 6 according to the second modification is different from that in one example described above, and is located on a bottom surface 320*c*, which faces the panel 2, of the supporting portion 31. In this case, the speaker 6 faces the opening of the opening portion 36 located on the speaker 6 side, so that the sound from the speaker 6 can easily come out of the electronic apparatus 1.

In one example of FIG. 9, a sound conducting part for transmitting the sound from the speaker 6 to the opening portion 36 may be located between the speaker 6 and the opening portion 36. The sound conducting part may be a member separated from the case 3. The sound conducting part may be attached to the panel 2, for example. The sound conducting part may have a tubular portion that faces a sound emitting hole of the speaker 6 and conducts the sound from the speaker 6 to the outside of the electronic apparatus 1, for example. The sound conducting part may be made of resin, for example. As described below, the speaker 6 may be located on the panel 2 instead of the case 3. For example, the speaker 6 may be attached to the panel 2 with the adhesive agent, the double-sided tape, or another member therebetween.

<Third Modification>

Figure 10:
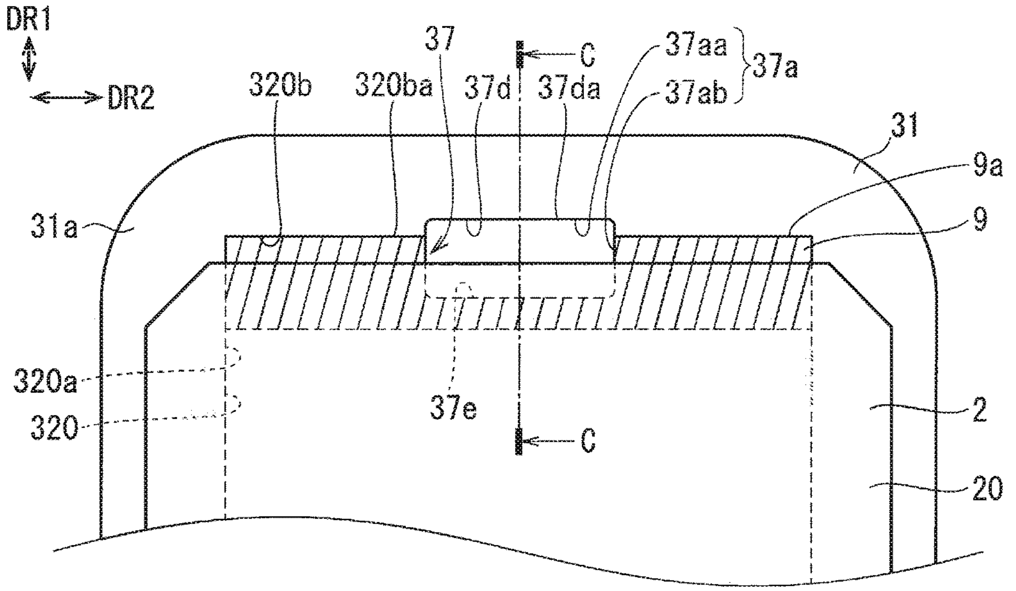
FIG. 10 illustrates a plan view showing the supporting portion to which the panel is bonded when viewed from the outer main surface side of the panel.
Figure 11:
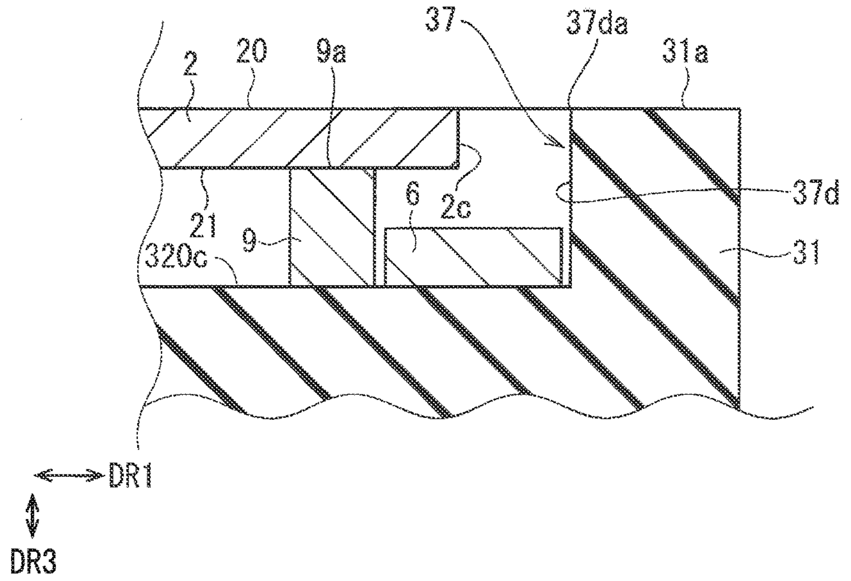
FIG. 11 illustrates a view showing an enlarged schematic cross-sectional structure of the electronic apparatus.

An opening portion for transmitting the sound from the speaker 6 to the outside of the electronic apparatus 1 may be formed by the case 3 and a member other than the panel 2 and the case 3. FIG. 10 illustrates a plan view showing the supporting portion 31, according to a third modification, to which the panel 2 is bonded when viewed from the outer main surface 20 side of the panel 2. FIG. 11 illustrates a view showing an enlarged schematic cross-sectional structure taken along a C-C line illustrated in FIG. 10.

As illustrated in FIG. 10, a member 9 is attached to the surface 320*b* being the upper portion of the inner wall 320*a* of the supporting portion 31. In FIG. 10, the member 9 is diagonally shaded. The member 9 is a member other than the panel 2 and the case 3. The member 9 is separated from the supporting portion 31 of the case 3 to support the panel 2, for example. As illustrated in FIG. 10, most part of the upper end portion of the panel 2 is supported by a support surface 9a of the member 9 located on the panel side.

The supporting portion 31 and the member 9 respectively have an opening 37*aa* and an opening 37*ab* that are opened toward the support surface 31*a*. The opening 37*aa* of the supporting portion 31 is connected to the opening 37*ab* of the member 9 in the first direction DR1. An opening 37*a* is thus formed. In other words, an opening portion 37 having the opening 37*a* is formed by the case 3 and the member 9.

The opening portion 37 has a surface 37*d* located on the supporting portion 31 side and a surface 37*e* located on the member 9 side that face each other in the first direction DR1. One end 37*da* of the surface 37*d* on the opening 37*a* side is not covered with the panel 2. The surface 37*e* is covered with the panel 2. In other words, the panel 2 covers the lower portion of the opening 37*a*.

As described above, even the opening portion 37 formed by the case 3 and the member 9 other than the panel 2 and the case 3 can transmit the sound from the speaker 6, which is located inside the case 3 so as to face the panel 2, to the outside of the electronic apparatus 1 in a similar manner as one example described above.

Although the speaker 6 is located inside the case 3 in one example described above, the disclosure is not limited to one example and the speaker 6 may be located on the panel 2. For example, the speaker 6 may be attached to the panel 2 with the adhesive agent, the double-sided tape, or a member other than the adhesive agent and the double-sided tape between the panel 2 and the speaker 6.

In one example described above, a member having a net-like pattern, for example, may be located in the opening portion for transmitting the sound from the speaker 6 to the outside of the electronic apparatus 1 in order to transmit the sound to the outside of the electronic apparatus 1 and keep dust out of the electronic apparatus 1.

Although one example above has described, as an example, the case in which the technology of the disclosure is applicable to the mobile phone, the technology of the disclosure is also applicable to any other electronic apparatus that includes the panel located on the surface thereof and the speaker. For example, the technology of the disclosure is also applicable to personal computers, tablet terminals, and wearable mobile electronic apparatuses worn in the arm or the like.

While the electronic apparatus 1 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:

a panel that comprises a first surface and a second surface located opposite to the first surface;

a case that supports the second surface;

a display panel that is located inside the case and faces the panel;

a speaker that is located inside the case and outputs a sound; and a cover member that covers at least part of the first surface, wherein the cover member does not cover a portion facing the display panel, the portion being included in the panel, the cover member comprises a first opening through which the sound output from the speaker is transmitted to the outside of the electronic apparatus, and the first opening and part of the case overlap each other in a first direction extending along a thickness direction of the panel, the case comprises a second opening that faces the speaker in a second direction extending along the thickness direction, the second opening including a center, and a third opening that faces the first opening in a third direction extending along the thickness direction, the third opening including a center, the second and third openings are not located in the display panel, the first to third openings do not overlap the display panel in the thickness direction, the sound output from the speaker is transmitted to the outside of the electronic apparatus through the second opening, the third opening, and the first opening in this order, and the first opening is smaller than the third opening in a longitudinal direction and the center of the second opening is offset in a longitudinal direction relative to the center of the third opening.

2. The electronic apparatus according to claim 1, wherein the part of the case includes an inclined region.

3. The electronic apparatus according to claim 2, wherein the inclined region is inclined against the first direction.

4. The electronic apparatus according to claim 1, wherein the case comprises a through hole comprising the second opening and the third opening, and an inner surface of the through hole includes the inclined region.

5. The electronic apparatus according to claim 4, wherein the second opening and part of the cover member overlap each other in a fourth direction extending along the thickness direction.

6. An electronic apparatus, comprising:

a panel that comprises a first surface and a second surface located opposite to the first surface;

a case that supports the second surface;

a display panel that is located inside the case and faces the panel;

a speaker that is located inside the case and outputs a sound; and a cover member that covers at least part of the first surface, wherein the cover member does not cover a portion facing the display panel, the portion being included in the panel, the cover member comprises a first opening through which the sound output from the speaker is transmitted to the outside of the electronic apparatus, the first opening and part of the case overlap each other in a first direction extending along a thickness direction of the panel, the case comprises a second opening that faces the speaker in a second direction extending along the thickness direction and a third opening that faces the first opening in a third direction extending along the thickness direction, the second and third openings are not located in the display panel, the first to third openings do not overlap the display panel in the thickness direction, the sound output from the speaker is transmitted to the outside of the electronic apparatus through the second opening, the third opening, and the first opening in this order, and the first opening is smaller than the third opening in a longitudinal direction and the third opening and part of the cover member where the first opening is not located overlap each other in a fourth direction extending along the thickness direction.

7. An electronic apparatus, comprising:

a panel that comprises a first surface and a second surface located opposite to the first surface;

a case that supports the second surface;

a display panel that is located inside the case and faces the panel;

a speaker that is located inside the case and outputs a sound; and a cover member that covers at least part of the first surface, wherein the cover member does not cover a portion facing the display panel, the portion being included in the panel, the cover member comprises a first opening through which the sound output from the speaker is transmitted to the outside of the electronic apparatus, and the first opening and part of the case overlap each other in a first direction along a thickness direction of the panel, wherein the case comprises a second opening through which the sound output from the speaker is transmitted to and through the first opening, and a third opening which faces the first opening in the thickness direction and transmits the sound having passed through the second opening to the first opening, the first opening is smaller than the third opening in a longitudinal direction, and a center of the second opening is offset in a longitudinal direction relative to a center of the first opening, the second and third openings are not located in the display panel, and the first to third openings do not overlap the display panel in the thickness direction.

* * * * *